(12) United States Patent
Zheng et al.

(10) Patent No.: US 6,779,765 B2
(45) Date of Patent: Aug. 24, 2004

(54) MOUNTING DEVICE FOR A RADAR DETECTOR

(75) Inventors: Yusan Zheng, Mississauga (CA); Glenn Douglas Martinson, Oakville (CA)

(73) Assignee: Beltronics USA Inc., West Chester, OH (US)

( * ) Notice: Subject to any disclaimer, the term of this patent is extended or adjusted under 35 U.S.C. 154(b) by 0 days.

(21) Appl. No.: 10/304,991

(22) Filed: Nov. 26, 2002

(65) Prior Publication Data

US 2004/0099775 A1 May 27, 2004

(51) Int. Cl.⁷ .......................... F16B 47/00; A47B 96/06
(52) U.S. Cl. .............................. 248/206.3; 248/231.81
(58) Field of Search .................. 248/206.3, 231.81, 248/231.85, 205.5, 206.2, 229.1, 205.1, 205.3, 362, 363, 229.16, 229.26; 296/97.8, 97.4; 224/559, 567; 297/417

(56) References Cited

U.S. PATENT DOCUMENTS

| | | | |
|---|---|---|---|
| 2,005,841 A | * 6/1935 | Kulp et al. .................... 24/327 |
| 4,279,396 A | * 7/1981 | Bendock .................. 248/205.5 |
| 4,391,053 A | 7/1983 | Anthony ...................... 40/152 |
| 4,648,572 A | * 3/1987 | Sokol ....................... 248/206.2 |
| 4,725,840 A | 2/1988 | Orazietti ...................... 342/20 |
| D296,771 S | 7/1988 | Dilgard ..................... D10/103 |
| 4,760,497 A | 7/1988 | Roston ....................... 361/427 |
| 4,807,935 A | 2/1989 | King .......................... 297/417 |
| 4,836,482 A | 6/1989 | Sokol ....................... 248/206.3 |
| 4,863,130 A | 9/1989 | Marks, Jr. ................. 248/206.3 |
| 4,887,753 A | 12/1989 | Allen .......................... 224/312 |
| 4,896,855 A | 1/1990 | Furnish .................... 248/206.3 |
| 4,944,548 A | * 7/1990 | Payne et al. ................ 296/97.8 |
| D310,167 S | 8/1990 | Reber, II ...................... D8/395 |
| D313,365 S | 1/1991 | Reber, II et al. ........... D10/121 |
| 5,016,850 A | 5/1991 | Plahn ....................... 248/206.3 |
| 5,020,754 A | 6/1991 | Davis et al. .............. 248/206.3 |
| 5,074,508 A | * 12/1991 | Powers .................... 248/291.1 |
| 5,082,225 A | * 1/1992 | Nespoli ................. 248/231.81 |
| 5,111,207 A | 5/1992 | Allen .......................... 342/20 |
| 5,251,777 A | 10/1993 | McMahon .................. 220/480 |
| 5,429,335 A | * 7/1995 | Cunningham ............ 248/229.1 |
| 5,592,244 A | * 1/1997 | Vyhmeister ................. 351/158 |
| 5,667,176 A | 9/1997 | Zamarripa et al. ..... 248/231.51 |
| 5,678,793 A | * 10/1997 | Hill ......................... 248/206.3 |
| 5,911,395 A | 6/1999 | Hussaini .................. 248/206.3 |
| 6,010,102 A | * 1/2000 | Dillion, Jr. ............... 248/206.3 |
| 6,036,071 A | * 3/2000 | Hartmann et al. .......... 224/547 |

FOREIGN PATENT DOCUMENTS

JP     7333320     12/1995 ............. G01S/7/38

* cited by examiner

Primary Examiner—Leslie A. Braun
Assistant Examiner—Tan Le
(74) Attorney, Agent, or Firm—Wood, Herron & Evans, L.L.P.

(57) ABSTRACT

A mounting device configured for attaching electronic devices, such as radar detectors, to sun visor or to a windshield. The mounting device includes a clip portion for securement to the sun visor and attachment points for a pair of suction cups for securement to the windshield. The mounting device further includes a pair of relatively pivotal bracket members configured for adjusting the angular orientation of the mounting device and the inclination angle of the electronic device. The bracket members have a latched condition in which rotation is prevented and an unlatched condition permitting relative rotation.

22 Claims, 3 Drawing Sheets

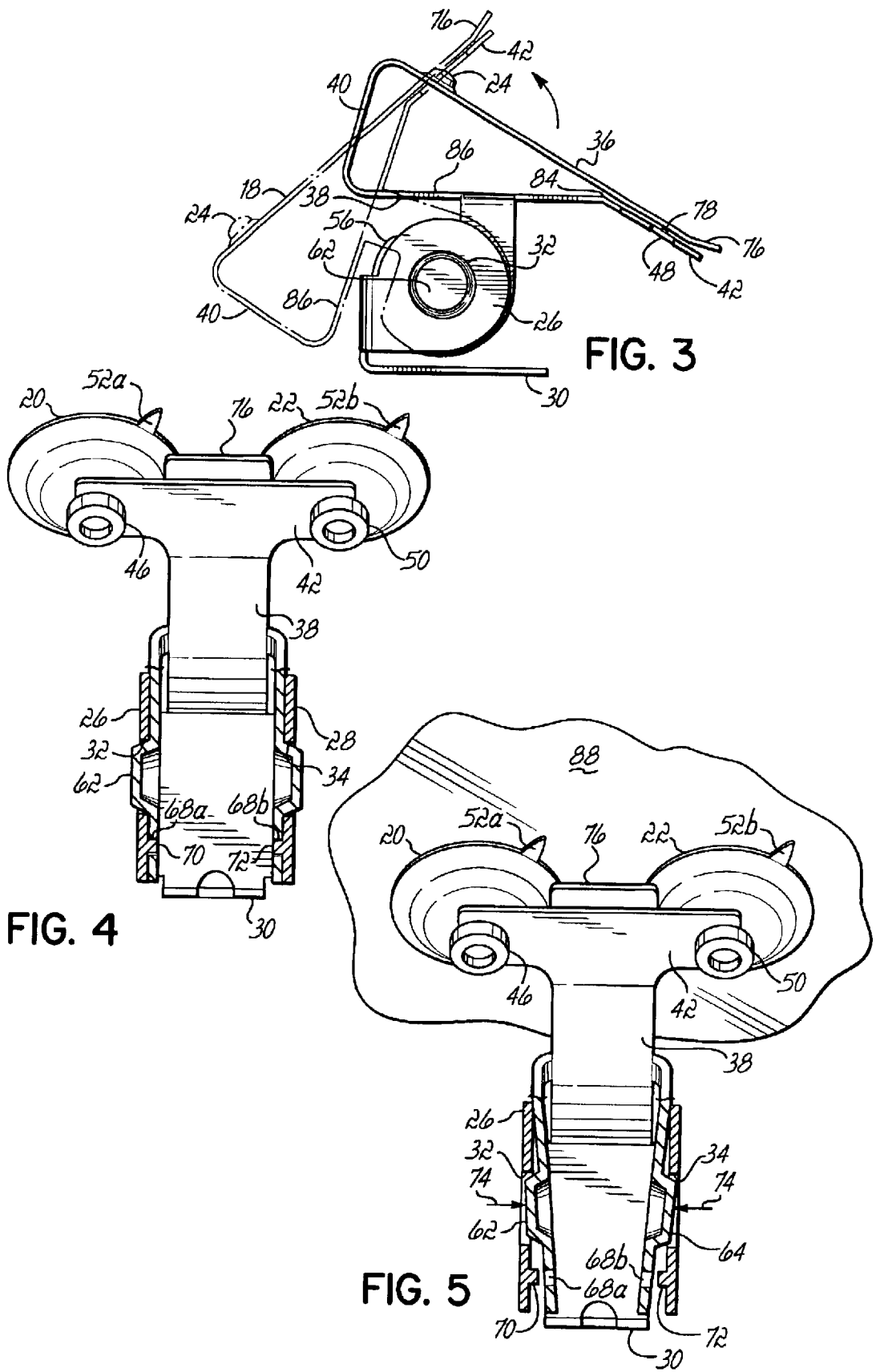

MOUNTING DEVICE FOR A RADAR DETECTOR

FIELD OF THE INVENTION

The present invention relates to mounting devices for electronic devices and, in particular, to mounting devices adapted for securing radar detectors alternatively to sun visors and windshields of a motor vehicle.

BACKGROUND OF THE INVENTION

Radar detectors are often employed in motor vehicles to provide audible and/or visual warnings when the motor vehicle is under police radar surveillance for potential speeding violations. Conventional radar detectors include a case that houses an antenna that receives incoming radar signals in the form of electromagnetic waves from a speed measurement device, internal circuitry that processes the received signals, and an audio/visual indicator that warns the driver of the presence of radar signals. The radar detector is powered via a corded plug that can be inserted into a powered receptacle of the motor vehicle or may be powered by batteries.

The radar detector is typically mounted within the passenger compartment of the motor vehicle in a location within the view and reach of the driver. To optimize the reception of the antenna, the radar detector is mounted with a forward-looking field of view of the highway that provides an unobstructed signal path through the windshield to the antenna. To that end, the radar detector is typically mounted either directly to the windshield, to the dashboard, or to the sun visor of the motor vehicle. Separate mounting brackets are usually provided for the various mounting options. One conventional mounting method is to removably mount the radar detector directly to the windshield using a windshield mounting bracket equipped with suction cups. Another conventional mounting method is to removably secure the radar detector to the sun visor by a visor mounting bracket having a visor clip. Such visor mounting brackets support the radar detector in a relatively high location behind the windshield and in a space accessible to the driver.

The radar detector and the conventional mounting brackets are detachably secured together so that the type of mounting bracket can be exchanged if the mounting location is switched. In addition, the radar detector is easily detachable from the mounting brackets in order to be concealed in, or removed from, the motor vehicle to discourage break-in and theft of the radar detector when the motor vehicle is unattended. After the radar detector is detached, the mounting bracket may remain attached to the sun visor or windshield, as may be the case.

Conventional mounting brackets limit the options available to the driver for effectively and efficiently mounting the radar detector within the passenger compartment. One significant limitation relates to accomplishing changes in the mounting location. When the mounting location of the radar detector is changed, for example, from the windshield to the sun visor, the driver must detach the windshield mounting bracket from the case and attach the sun visor mounting bracket. Such exchanges are tedious for the driver to accomplish and are particularly hazardous if attempted by the driver while the motor vehicle is being driven due to the distraction. In addition, the disassociated mounting bracket must be stored until needed and, as a result, is prone to being mislaid, misplaced or lost.

Another limitation of conventional visor mounting brackets is that sun visors are seldom oriented horizontally relative to the highway when in a stored position. Conventional visor mounting brackets lack angular adjustability and cannot compensate for the non-horizontal orientation of the sun visor in order to orient the radar detector horizontally for optimizing the sensitivity for incoming radar signals. In addition, when the sun visor is deployed with an angular orientation that shades the driver's vision from unwanted sunlight, the radar detector must be removed. It is apparent that conventional mounting brackets have not satisfactorily provided solutions for mounting radar detectors and other portable electronic devices mountable within the passenger compartment of a motor vehicle.

Therefore, there is a need for a mounting bracket for radar detectors and other devices having various mounting options available without the risk of lost or misplaced components and having an ability to effectively accommodate non-horizontal angular orientations of the sun visor.

SUMMARY OF THE INVENTION

The invention is related to a mounting device for an electronic device, such as a radar detector, adapted to permit both windshield mounting and visor mounting in a motor vehicle. According to the principles of the invention, a mounting device for attaching an electronic device alternatively to a sun visor and a windshield includes a bracket configured to releasably couple with a radar detector and having pair of clamping arms movable relative to each other for defining a channel dimensioned to slidingly receive a sun visor. One of the clamping arms is resiliently biased toward the other of the clamping arms for gripping opposite sides of the sun visor. Positioned on one of the clamping arms is at least one suction-cup attachment member and attached to each suction-cup attachment member is a suction cup. The suction cup is configured for selective engagement with a windshield.

According to the principles of the invention, a mounting device is provided for alternatively securing an electronic device to a sun visor and a windshield. The mounting device includes a bracket having a pair of relatively pivotal or rotatable bracket members in which one of the bracket members is capable of being removably secured with the electronic device. Mounted to one of the bracket members is a first attachment element configured to removably secure the bracket to a sun visor. Also mounted to one of the bracket members is a second attachment element configured to removably secure the bracket to a windshield.

According to the principles of the invention, a mounting device is provided for attaching an electronic device alternatively to a sun visor and a windshield. The mounting device includes a first bracket member having a pair of transversely-spaced first flanges and a second bracket member having a pair of transversely-spaced second flanges pivotally coupled with the first flanges. One of the first and second bracket members is removably attachable to the electronic device. At least one of the first flanges of the first bracket member includes a plurality of mating receptacles. At least one of the second flanges of the second bracket member includes a projection capable of being engaged with at least one of the plurality of mating receptacles to provide a latched condition and capable of being disengagable from the plurality of mating receptacles to provide an unlatched condition in which the two bracket members are relatively pivotal or rotatable.

The objects and advantages of the present invention will be further appreciated in light of the following detailed description and drawings in which:

BRIEF DESCRIPTION OF THE DRAWINGS

FIG. 3 is a side view of the mounting bracket of FIG. 1 illustrating angular adjustability between two angular positions;

FIG. 4 is an end view of the mounting bracket of FIG. 1 illustrating a latched condition in which the mounting bracket is secured against angular movement;

FIG. 5 is an end view of the mounting bracket of FIG. 1 illustrating an unlatched condition in which the mounting bracket allows angular movement.

DETAILED DESCRIPTION OF THE INVENTION

Although the invention will be described next in connection with certain embodiments, the invention is not limited to practice in any one specific type of radar detector. It is contemplated that the principles of the invention can be used with a wide variety of electronic devices including, but not limited to, radar detectors. Exemplary radar detectors with which the invention may be used are commercially available, for example, from Beltronics USA Inc. (Mississauga, Ontario), Escort Inc. (West Chester, Ohio), Uniden America Corporation (Fort Worth, Tex.), Whistler Inc. (Bentonville, Ark.), and Cobra Electronics Corporation (Chicago, Ill). The principles of the invention are also applicable to electronic devices capable of receiving and interpreting coded signals that alert drivers to the presence of highway hazards and traffic conditions and to electronic devices having transponders capable of receiving and transmitting signals. The description of the invention is intended to cover all alternatives, modifications, and equivalent arrangements as may be included within the spirit and scope of the invention as defined by the appended claims. In particular, those skilled in the art will recognize that the components of the invention described herein could be arranged in multiple different ways.

Figure 1:
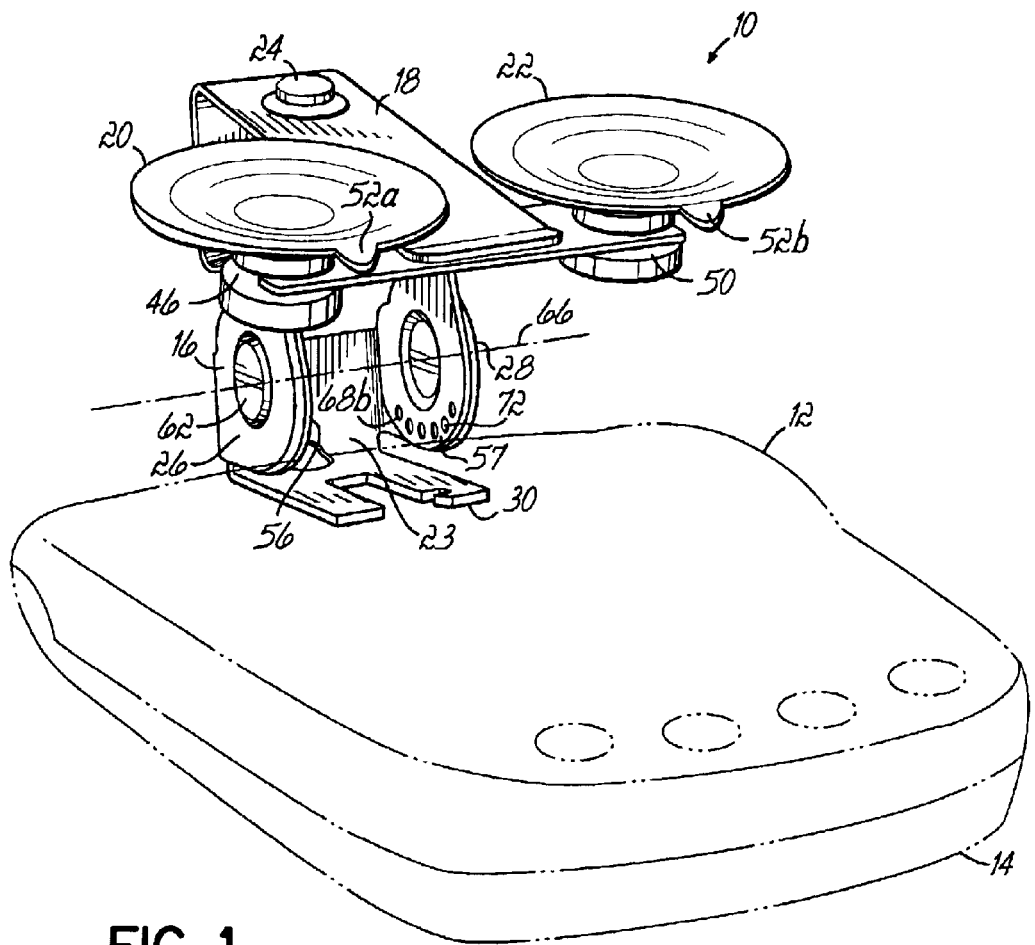
FIG. 1 is a perspective view of the mounting bracket in accordance with the principles of the invention shown attached to an electronic device.

With reference to FIG. 1, a mounting bracket 10 constructed according to the principles of the invention is shown attached to an outer case 12 of an electronic device 14, such as a radar detector. The outer case 12 houses an antenna configured to receive incoming electromagnetic waves or radar signals, internal circuitry that processes the electromagnetic waves, an audio/visual indicator that warns the driver of the presence of electromagnetic, and possibly a transmitter to emit outgoing electromagnetic waves.

The mounting bracket 10 is an assembly including a base bracket member 16, a spring bracket member 18 pivotally coupled with the base bracket member 16, a pair of transversely spaced suction cups 20, 22 removably attached to the spring bracket member 18, and a bumper 24 spaced forwardly from the suction cups 20, 22. As used herein, the terms "forward" or "front" refer to the direction or side toward the front of the motor vehicle, the terms "rearward" or "rear" refer to the direction or side toward the rear of the motor vehicle, and the term "transverse" refers to the direction or side substantially orthogonal to an imaginary line connecting the front and rear of the motor vehicle.

The base bracket member 16 includes a generally planar base 23, a pair of flanges 26, 28 each extending outwardly and rearwardly from a corresponding one of opposed transverse side edges of the base 23, and a bifurcated coupling arm 30 extending outwardly and rearwardly from a bottom edge of the base 23. The flanges 26, 28 are oriented in substantially parallel planes and have a transversely-spaced relationship. Flange 26 has a central opening 32 with a center aligned generally coaxial with the center of a central opening 34 provided in flange 28. The bifurcated coupling arm 30 cooperates with a latching mechanism (not shown) incorporated into the outer case 12 for releasably securing the mounting bracket 10 with the electronic device 14.

Figure 2:
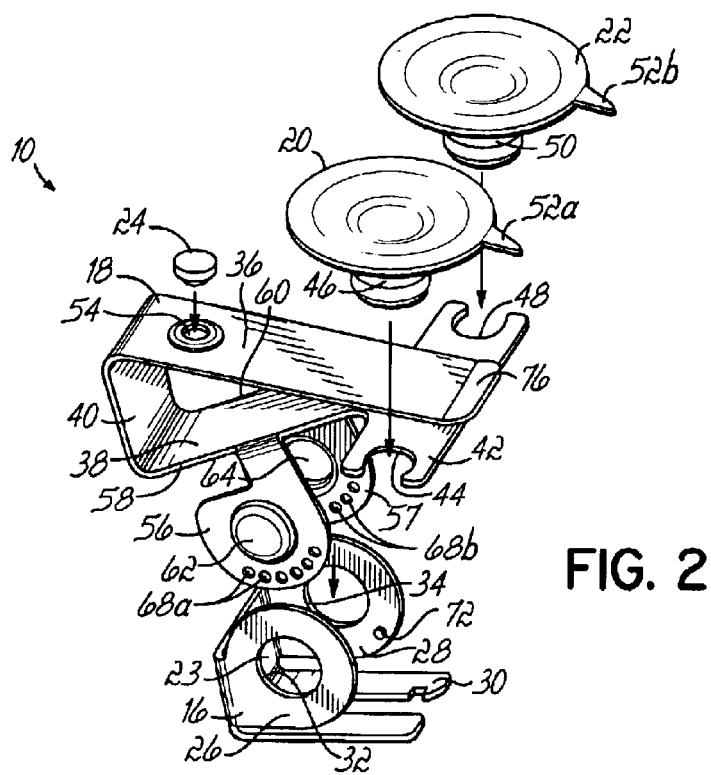
FIG. 2 is an exploded top view of the mounting bracket of FIG. 1.

With continued reference to FIGS. 1 and 2, the spring bracket member 18 is folded in a generally triangular shape to form a spring clip having an upper clamping arm 36 connected to a lower clamping arm 38 by a forward bridging portion 40 extending vertically between the clamping arms 36, 38. The upper and lower clamping arms 36, 38 are resiliently biased toward each other. Extending transversely from a rearward end of the lower clamping arm 38 is an integral stabilizing member 42. Provided at one transverse end of stabilizing member 42 is an outwardly-opening, notch-shaped, suction-cup attachment member 44 capable of engaging a circumferential groove 46 on the backside of suction cup 20. Similarly, provided at an opposite transverse end of stabilizing member 42 is another outwardly-opening, notch-shaped, suction-cup attachment member 48 capable of engaging a circumferential groove 50 on the backside of suction cup 22. The suction cups 20, 22 are removable from their respective grooves 46, 50.

The suction cups 20, 22, after attachment to the stabilizing member 42, are used to secure the mounting bracket 10 and electronic device 14 by a vacuum engagement to a windshield 88 (FIG. 5) of a motor vehicle. Each of the suction cups 20, 22 includes a respective tab 52a, 52b used to lift the edge and release the suction for removing the mounting bracket 10 from the windshield 88. The invention contemplates various substitutes for the suction cups 20, 22 including, but not limited to, hook and loop fasteners and adhesive fasteners, such as double-sided tape.

The transverse spacing between the two suction cups 20, 22 provides two engagement points of a three-point support arrangement that lends stability when the mounting bracket 10 is coupled with windshield 88. The bumper 24, received in a circular recessed mount 54 formed in upper clamping arm 36, provides the third point of engagement with the windshield 88 for stabilizing the mounting bracket 10 and electronic device 14 against unwanted movement. It is contemplated by the invention that bumper 24 may be replaced by a suction cup (not shown) similar in construction to suction cups 20, 22.

The spring bracket member 18 further includes a transversely-spaced pair of parallel flanges 56, 57 that extend outwardly and downwardly from a central location along a corresponding one of opposite side edges 58, 60 of the lower clamping arm 38. The flanges 56, 57 have a spaced relationship dimensioned for engagement with flanges 26, 28. Flange 56 has a disk-shaped mount button 62 aligned generally coaxial with a disk-shaped mount button 64 provided in flange 57. The mount buttons 62, 64 protrude outwardly from the flanges 56, 57 in opposite transverse directions. When the mounting bracket 10 is assembled, the bracket member 16, 18 are engaged such that mount button 62 is received in central opening 32 and mount button 64 is received in central opening 34.

According to one aspect of the invention and with reference to FIGS. 2 and 3, the base bracket member 16 and the spring bracket member 18 have an adjustable relative angular relationship for changing the inclination angle of the electronic device 14. To that end, the engagement between the openings 32, 34 of base bracket member 16 and the mount buttons 62, 64 of the spring bracket member 18 defines a transverse axis of rotation, indicated generally by reference numeral 66 (FIG. 1), about which the bracket members 16, 18 are relatively rotatable in an unlatched condition. The transverse axis of rotation 66 is generally aligned with the center of the openings 32, 34. The bumper 24 is positioned on an opposite side of the transverse axis of rotation 66 from the attachment points 44, 48.

The angular relationship between the base bracket member 16 and the spring bracket member 18 is adjustable among a plurality of angular orientations defined by two sets of mating receptacles or detents 68a, 68b. The detents 68a, 68b are positioned with regular angular spacings in an arc extending about a respective circumference of each flange 56, 57 of the spring bracket member 18. The detents 68a, 68b may be throughholes, as illustrated in FIG. 2, concave-inwardly recesses or blind holes, slotted notches opening to an outer edge of the respective flange 56, 57, or various combinations of these configurations. Flange 26 of the base bracket member 16 includes an inwardly-projecting projection 70 located at a radial position relative to the center of the opening 32 corresponding to the radius of the arc of detents 68a. Similarly, flange 28 of the base bracket member 16 includes an inwardly-projecting projection 72 located at a radial position relative to the center of the opening 34 corresponding to the radius of the arc of detents 68b. The projections 70, 72 are aligned along a shared transverse axis (not shown). Each of the projections 70, 72 is dimensioned and configured to be received in each of the detents 68a, 68b. The various different allowed angular orientations of the base bracket member 16 and the spring bracket member 18 are defined by the coincidence of the projection 70 with one of the plurality of detents 68a, and projection 72 with one of the plurality of detents 68b, wherein the pairs of engagable detents 68a, 68b are aligned along corresponding transverse axes (not shown).

It is contemplated by the invention that the mechanism for varying the relative angular orientation of the base and spring bracket members 16, 18. For example, both of the bracket members 16, 18 may be provided with a respective set of throughholes arranged in an arc that are aligned, following relative pivoting of the bracket members 16, 18 to a given angular orientation, for the insertion of a pin that latches or locks the angular position.

With reference to FIG. 4, the mounting bracket 10 has a latched condition in which the flanges 56, 57 are in an undeflected position and the projections 70, 72 are engaged with a corresponding one of the detents 68a, 68b. The engagement between the projection 70 and the corresponding one of the detents 68a and the projection 72 and the corresponding one of the detents 68b places the mounting bracket 10 in a latched condition in which the angular relationship between the base bracket member 16 and the spring bracket member 18 is fixed against accidental or unintended rotation about transverse axis of rotation 66.

The spring bracket member 18 is formed from any suitable material having resiliency, such as a spring steel and, more specifically, AISI 1074 spring steel, and the base bracket member 16 is formed from a stiffer material, such as a cold rolled steel. Bracket members 16, 18 are fabricated by any suitable forming process, such as stamping the components from sheet metal and bending to shape.

With reference to FIG. 5, the mounting bracket 10 has an unlatched condition in which the spring bracket member 18 is rotatable relative to the base bracket member 16. To that end, the transverse spacing between flanges 56, 57 of spring bracket member 18 can be decreased by applying an inwardly-directed force, generally in the direction of arrows 74, concurrently to both mount buttons 62, 64 so that the flanges 56, 57 of the spring bracket member 18 are deflected inwardly toward one another. The magnitude of the inwardly-directed force for moving the mount buttons 62, 64 inwardly must be sufficient to overcome the biasing force of the spring bracket member 18. The inwardly-directed force cantilevers the flanges 56, 57 relative to flanges 26, 28 and, thereby, removes the projections 70, 72 from the corresponding one of detents 68a, 68b, respectively, so that the spring bracket member 18 is angularly rotatable relative to the base bracket member 16. In the unlatched condition, the relative angular orientation of the base bracket member 16 and the spring bracket member 18 may be varied by rotation of the spring bracket member 18 relative to the base bracket member 16. When a desired relative angular relationship is achieved, the inward force applied to the mount buttons 62, 64 is released so that the projections 70, 72 can engage different respective ones of the detents 68a, 68b. The angular adjustability permits the mounting bracket 10 to be mounted to vehicle windshields 88 of different slopes while maintaining the electronic device 14 in a substantially horizontal condition. Typically, the bifurcated coupling arm 30 is oriented in a horizontal plane when the electronic device 14 is oriented horizontally.

Figure 6:
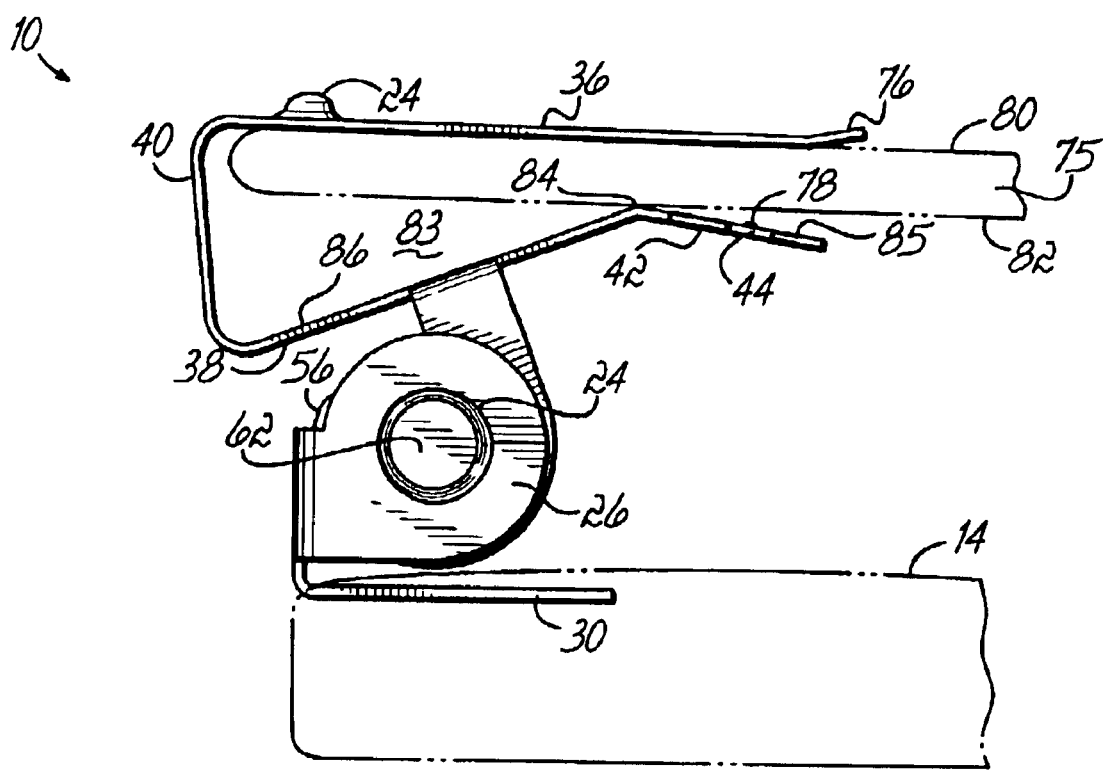
FIG. 6 is a perspective view of the mounting bracket of FIG. 1 shown attached to a sun visor.

With reference to FIG. 6, the mounting bracket 10 is capable of being attached to a sun visor 75 of a motor vehicle. To that end, the upper clamping arm 36 of the spring bracket member 18 is capable of resiliently deflecting from the lower clamping arm 38 for defining a channel 83 dimensioned to slidingly receive the sun visor 75. The sun visor 75 is gripped on opposite sides by the clamping arms 36, 38. Positioned on the stabilizing member 42 of the lower clamping arm 38 is a transversely-spaced plurality of, for example, two raised projections of which one raised projection 78 is shown in FIG. 6, directed toward the upper clamping arm 36. The projections 78 separate the clamping arms 36, 38 apart when the sun visor 75 is absent. It is appreciated that the projections 78 may be positioned alternatively on the upper clamping arm 36 and project downwardly toward the lower clamping arm 38. An inclined free end 76 of the upper clamping arm 36 is angled away from the lower clamping arm 38 and aids in guiding the edge of the sun visor 75 between the upper and lower clamping arms 36, 38 when the mounting bracket 10 is pushed onto the sun visor. The free end 76 is angled with an acute angle relative to a horizontal plane containing the rest of the upper clamping arm 36 and, in one specific embodiment, the free end 76 is inclined at a 30° angle relative to a plane containing the rest of the upper clamping arm 36. It is contemplated by the invention that the lower clamping arm 38 may also be provided with a free end, similar to free end 76.

Sliding contact between an upper surface 80 of the sun visor 75 and the leading tip 76 and between a lower surface 82 of the sun visor 75 and the free end 85 of the lower clamping arm 38 deflects the clamping arms 36, 38 apart as the mounting bracket 10 is pushed onto the sun visor 75. When the sun visor 75 is captured between the upper and lower clamping arms 36, 38, as shown in FIG. 6, the upper surface 80 is generally coextensive with the inwardly facing planar surface of the upper clamping arm 36 and the lower surface 82 is contacted by a radiused transverse ridge 84 formed at the junction of a forward edge of the stabilizing member 42 and an inward portion 86 of the lower clamping arm 38 that is angled forwardly and downwardly. The upper and lower clamping arms 36, 38 collectively apply a clamping force, when the mounting bracket 10 is attached to the sun visor 75, adequate to secure the mounting bracket 10 and electronic device 14 to the sun visor 75. The angular orientation of the mounting bracket 10 can be adjusted, as described herein, to place the electronic device 14 in a horizontal orientation. It is appreciated that the suction cups 20, 22 may be removed from the mounting bracket 10 before attachment to the sun visor 75 and stored, or inverted and reattached to the attachment members 44, 48 for storage.

In use, the driver elects whether to use the mounting bracket 10 for mounting the electronic device 14 to an inside surface of the windshield 88 (FIG. 5) or to the sun visor 75 (FIG. 6). If mounted to the windshield 88, the suction cups 20, 22 of the mounting bracket 10 are mounted within the notches of the spring bracket member 18. The suction cups 20, 22 are adhered to the interior side of the windshield 88 at a position suitable to provide the antenna of the electronic device 14 with a forward-looking field of view. To that end, the suction cups 20, 22 are pressed against the windshield 88 until substantially all of the air is forced from between the suction cups 20, 22 and windshield 88 thereby creating a vacuum.

The electronic device 14 is attached to the mounting bracket 10 with the controls and visual indicator of the electronic device 14 oriented toward the rear of the vehicle. The electronic device 14 is provided with a substantially horizontal attitude by applying an inwardly directed force to the mount buttons 62, 64 to release the projections 70, 72 from their respective detents 68a, 68b to provide the unlatched condition. Thereafter, a controlled rotational force is manually applied to rotate the spring bracket member 18 angularly relative to the base bracket member 16. In the unlatched condition, the engagement between each of the mount buttons 62, 64 and the corresponding one of the openings 32, 34 is maintained so that the spring bracket member 18 remains attached to the base bracket member 16. When the desired angular inclination for the electronic device 14 is achieved, the inwardly directed force applied to the mount buttons 62, 64 is released and the projections 70, 72 each re-engage one of the nearest detents 68a, 68b, perhaps with additional angular rotation, to provide the latched condition. The mounting bracket 10 may be removed from the windshield 88 in the latched condition to retain the angular adjustment for future re-attachment to the windshield 88.

If the mounting bracket 10 is to be mounted to the sun visor 75, the suction cups 20, 22 are first removed. The mounting bracket 10 is positioned relative to the sun visor 75 so that the upper and lower clamping arms 36, 38 of the spring bracket member 18 are pressed against the edge of the sun visor 75 nearest to the windshield 88. The edge of the sun visor 75 is forced between the inclined leading tip 76 and the free end 85. The upper and lower clamping arms 36, 38 separate to provide a gap that allows the spring bracket member 18 to be slidingly maneuvered onto the sun visor 75. After being positioned on the sun visor 75, the upper and lower clamping arms 36, 38 apply an inwardly-directed clamping force to the sun visor 75 that stabilizes the location of the electronic device 14 relative to the sun visor 75. The outer case 12 of the electronic device 14 may be engaged with the mounting bracket 10 either before or after clipping the mounting bracket 10 onto the sun visor 75. After engagement, the electronic device 14 is suspended from an underside of the sun visor 75. The angular inclination of the electronic device 14 may be adjusted, as described above, among multiple different fixed angular orientations to accommodate a non-horizontal orientation of the sun visor 75 so that the electronic device 14 is oriented horizontally relative to the highway.

The mounting bracket of the invention has various advantages over conventional mounting brackets. Specifically, the mounting bracket of the invention integrates dual mounting options for windshield mounting and visor mounting into a single, integral component. As a result, the need for two separate mounting brackets is eliminated. In addition, the angular orientation of the mounting bracket is adjustable when attached to a windshield or to a sun visor among multiple fixed angular positions.

While the present invention has been illustrated by a description of various embodiments and while these embodiments have been described in considerable detail, it is not the intention of the Applicants to restrict or in any way limit the scope of the appended claims to such detail. Additional advantages and modifications will readily appear to those skilled in the art. The invention in its broader aspects is therefore not limited to the specific details, representative apparatus and methods, and illustrative examples shown and described. Accordingly, departures may be made from such details without departing from the spirit or scope of Applicants' general inventive concept. The scope of the invention itself should only be defined by the appended claims, wherein.

We claim:

1. An apparatus alternatively attachable to a sun visor or a windshield of a vehicle, comprising:

a bracket including a coupling member and a pair of clamping arms movable relative to each other for defining a channel dimensioned to slidingly receive the sun visor, one of said pair of clamping arms being resiliently biased toward the other of said pair of clamping arms;

at least one suction-cup attachment member positioned on one of said pair of clamping arms;

a suction cup attached to said at least one suction-cup attachment member and configured for selective engagement with the windshield when the sun visor is not received in said channel; and an electronic device configured to be releasably coupled with said coupling member of said bracket.

2. The apparatus of claim 1 wherein one of said pair of clamping arms includes a free end angled away from the other of said clamping arms, said free end causing said pair of clamping arms to be urged apart when said first bracket is pushed onto the sun visor with the sun visor positioned between said free end and the other of said pair of clamping arms.

3. The apparatus of claim 1 wherein said pair of clamping arms is positioned relative to said at least one suction-cup attachment member to avoid interference in the engagement of said suction cup with the windshield.

4. The apparatus of claim 1 wherein said pair of clamping arms is positioned below a window-engaging portion of said suction cup to avoid interference in the engagement of said suction cup with the windshield.

5. The apparatus of claim 1 wherein said suction cup is removable from said at least one suction-cup attachment member to facilitate mounting said bracket to the sun visor.

6. The apparatus of claim 1 wherein said electronic device is a radar detector.

7. A mounting device for alternatively securing an electronic device to a sun visor or a windshield of a vehicle, comprising:

a bracket having a pair of relatively pivotal bracket member, one of said bracket members capable of being removably secured with the electronic device;

a first attachment element mounted to one of said bracket members, said first attachment element configured to removably secure the bracket to the sun visor; and a second attachment element mounted to one of said bracket members, said second attachment element configured to removably secure the bracket to the windshield, said second attachment element including at least one suction cup, and said first and second attachment elements being concurrently mounted to said bracket.

8. The mounting device of claim 7 wherein one of said bracket members includes a lower arm and an upper arm with one of said upper and lower arms being biased toward the other of said upper and said lower arms, said upper and lower arms capable of clampingly engaging opposite side surfaces of the sun visor.

9. A mounting device for attaching an electronic device to a windshield, comprising:

a first bracket member having a pair of transversely-spaced first flanges and a plurality of mating receptacles on at least one of said first flanges;

a second bracket member having a pair of transversely-spaced second flanges pivotally coupled with said first flanges, one of said first and second bracket members being removably attachable to the electronic device, at least one of said second flanges having a projection capable of being engaged with at least one of said plurality of mating receptacles to provide a latched condition and being disengageable from said plurality of mating receptacles to provide an unlatched condition in which the two bracket members are relatively pivotal;

at least one suction-cup attachment member positioned on one of said first and said second bracket members; and a suction cup attached to said at least one suction-cup attachment member and configured for selective engagement with the windshield.

10. The mounting device of claim 9 wherein said second flanges are moveable relative to said first flanges to disengage said projection from said plurality of mating receptacles, the unlatched condition being provided by applying an inwardly-directed force to said mount buttons that disengages said projection from said plurality of mating receptacles.

11. The mounting device of claim 9 wherein said projection is inwardly-oriented and said plurality of mating receptacles are configured to engage said projection.

12. The mounting device of claim 11 wherein each of said plurality of mating receptacles is selected from the group consisting of a notch, a blind hole, a throughhole, and combinations thereof.

13. An apparatus for detecting electromagnetic waves that is alternatively securable to a sun visor or a windshield of a vehicle, comprising:

an electronic device configured to sense electromagnetic waves;

a bracket having a pair of bracket members, one of said bracket members capable of being removably secured with said radar detector, and said bracket members having a latched condition in which the relative angular orientation of the bracket members is prevented and an unlatched condition in which the bracket members are relatively pivotal;

a first attachment element mounted to one of said bracket members, said first attachment element configured to removably secure the bracket to the sun visor; and a second attachment element mounted to one of said bracket members, said second attachment element configured to removably secure the bracket to the windshield.

14. The apparatus of claim 13 wherein said second attachment element includes at least one suction cup.

15. The apparatus of claim 13 wherein one of said bracket members includes a lower arm and an upper arm with one of said upper and lower arms being biased toward the other of said upper and said lower arms, said upper and lower arms capable of clampingly engaging opposite side surfaces of the sun visor.

16. The apparatus of claim 13 wherein one of said bracket members includes a plurality of mating receptacles and the other of said bracket members includes a projection capable of being individually engaged with at least one of said plurality of mating receptacles for arresting the angular relationship between said relatively pivotal bracket members.

17. The apparatus of claim 13 wherein said electronic device is a radar detector.

18. A mounting device for attaching an electronic device alternatively to a sun visor or a windshield of a vehicle, comprising:

a bracket configured to releasably couple with the electronic device, said bracket having pair of clamping arms movable relative to each other for defining a channel dimensioned to slidingly receive the sun visor, one of said clamping arms being resiliently biased toward the other of said clamping arms;

at least one suction-cup attachment member positioned on one of said clamping arms;

a transverse stabilizing member located on one of said clamping arms, said stabilizing arm carrying said at least one suction-cup attachment member; and a suction cup attached to said at least one suction-cup attachment member and configured for selective engagement with the windshield.

19. The mounting device of claim 18 further comprising two suction-cup attachment members and two suction cups each attached to a corresponding one of said suction-cup attachment members, said suction-cup attachment members adjacent opposite ends of said transverse stabilizing member for attaching said suction cups adjacent opposite ends of said transverse stabilizing member.

20. A mounting device for alternatively securing an electronic device to a sun visor or a windshield of a vehicle, comprising:

a bracket having a pair of relatively pivotal bracket members, one of said bracket members capable of being removably secured with the electronic device;

a first attachment element mounted to one of said bracket members, said first attachment element configured to removably secure the bracket to the sun visor;

a second attachment element mounted to one of said bracket members, said second attachment element configured to removably secure the bracket to the windshield;

a plurality of mating receptacles on one of said bracket members; and a projection on the other of said bracket members capable of being individually engaged with at least one of said plurality of mating receptacles for arresting the angular relationship between said relatively pivotal bracket members.

21. A mounting device for attaching an electronic device to a windshield, comprising:

a first bracket member having a pair of transversely-spaced first flanges, a plurality of mating receptacles on at least one of said first flanges, and a pair of mount buttons each located on one of said pair of transversely-spaced first flanges; and a second bracket member having a pair of transversely-spaced second flanges each having an opening pivotally coupled with a corresponding one of said mounting buttons to provide a transverse axis of rotation for said first bracket member relative to said second bracket member, one of said first and second bracket members being removably attachable to the electronic device, and at least one of said second flanges having a projection capable of being engaged with at least one of said plurality of mating receptacles to provide a latched condition and being disengageable from said plurality of mating receptacles to provide an unlatched condition in which the two bracket members are relatively pivotal.

22. A mounting device for attaching an electronic device to a sun visor, comprising:

a first bracket member having a pair of transversely-spaced first flanges and a plurality of mating receptacles on at least one of said first flanges;

a second bracket member having a pair of transversely-spaced second flanges pivotally coupled with said first flanges, one of said first and second bracket members being removably attachable to the electronic device, at least one of said second flanges having a projection capable of being engaged with at least one of said plurality of mating receptacles to provide a latched condition and being disengageable from said plurality of mating receptacles to provide an unlatched condition in which the two bracket members are relatively pivotal; and a pair of clamping arms carried by said first bracket, said pair of bracket arms movable relative to each other for defining a channel dimensioned to slidingly receive the sun visor, one of said pair of clamping arms being resiliently biased toward the other of said pair of clamping arms.

* * * * *

UNITED STATES PATENT AND TRADEMARK OFFICE
CERTIFICATE OF CORRECTION

PATENT NO.     : 6,779,765 B2
DATED          : August 24, 2004
INVENTOR(S)    : Yusan Zheng and Glenn Douglas Martinson It is certified that error appears in the above-identified patent and that said Letters Patent is hereby corrected as shown below:

Column 3,
Line 52, reads "...driver of the presence of electromagnetic, and possibly a ..." and should read -- ...driver of the presence of eletromagnetic waves, and possibly a... --.

Column 4,
Line 63, reads "...bracket member 16, 18 are engaged such that mount button..." and should read -- ...bracket members 16, 18 are engaged such that mount button... --.

Column 5,
Lines 40-42, read "It is contemplated by the invention that the mechanism for varying the relative angular orientation of the base and spring bracket members 16, 18. For example, both of the..." and should read -- It is contemplated by the invention that the mechanism may differ for varying the relative angular orientation of the base and spring bracket members 16, 18. For example, both of the... --.

Column 8,
Line 48, reads "...of clamping arms to be urged apart when said first bracket..." and should read -- ...of clamping arms to be urged apart when said bracket... --.

Column 9,
Lines 1-2, reads "...a bracket having a pair of relatively pivotal bracket member, one of said bracket members capable of being..." and should read -- ...a bracket having a pair of relatively pivotal bracket members, one of said bracket members capable of being... --.

UNITED STATES PATENT AND TRADEMARK OFFICE
CERTIFICATE OF CORRECTION

PATENT NO. : 6,779,765 B2
DATED : August 24, 2004
INVENTOR(S) : Yusan Zheng and Glenn Douglas Martinson It is certified that error appears in the above-identified patent and that said Letters Patent is hereby corrected as shown below:

Column 10,
Line 29, reads "...electronic device, said bracket having pair of clamping..." and should read -- ...electronic device, said bracket having a pair of clamping... --.

Signed and Sealed this

Thirtieth Day of August, 2005

JON W. DUDAS
*Director of the United States Patent and Trademark Office*